US006752861B2

(12) United States Patent
Spinelli

(10) Patent No.: US 6,752,861 B2
(45) Date of Patent: Jun. 22, 2004

(54) DEVICE FOR THE SEPARATION OF LIQUID AND/OR SOLID POLLUTANTS ENTRAINED BY GASEOUS STREAMS

(75) Inventor: Umberto Spinelli, Milan (IT)

(73) Assignee: Micronsep S.r.l., Barzano (IT)

( * ) Notice: Subject to any disclaimer, the term of this patent is extended or adjusted under 35 U.S.C. 154(b) by 0 days.

(21) Appl. No.: 10/154,322

(22) Filed: May 23, 2002

(65) Prior Publication Data

US 2003/0217536 A1 Nov. 27, 2003

(51) Int. Cl.[7] .............................................. B01D 45/12
(52) U.S. Cl. ...................................... 96/189; 55/459.3
(58) Field of Search .......................... 96/188, 189, 190, 96/191; 55/428, 447, 459.3

(56) References Cited

U.S. PATENT DOCUMENTS

| 1,533,501 A | 4/1925 | Hughes |
| 3,654,748 A | 4/1972 | Bloom |
| 5,238,475 A | 8/1993 | Keuschnigg |
| 5,314,529 A | 5/1994 | Tilton et al. |
| 5,460,147 A | 10/1995 | Bohl |

FOREIGN PATENT DOCUMENTS

| FR | 2011821 | 3/1970 | |
| JP | 54073367 A | * 6/1979 | ................. 55/459.3 |
| SU | 1 407 521 | 7/1988 | |
| WO | WO 98/52673 | 11/1998 | |

OTHER PUBLICATIONS

EP Search Report.

* cited by examiner

Primary Examiner—Robert A. Hopkins
(74) Attorney, Agent, or Firm—Hedman & Costigan, P.C.

(57) ABSTRACT

A device for the separation of liquid and/or solid pollutants entrained by gaseous streams, comprising a separating element (11), contained inside a protective casing (12) which comprises a gas inlet and outlet (13, 14), wherein the separating element (11) includes a coil (17). The coil (17) is situated between an outlet disk (18), having an outlet hole (20), and an unloading disk (19), wherein the unloading disk (19) has a series of discharge channels (21), relating to the external loops of the coil (17), and discharge channels (21'), relating to the internal loops of the coil (17), so that the geometrical parameters of the coil (17) and the distribution of the discharge channels (21, 21') allow liquid and/or solid micro-particles to be eliminated from a stream of gas.

10 Claims, 2 Drawing Sheets

DEVICE FOR THE SEPARATION OF LIQUID AND/OR SOLID POLLUTANTS ENTRAINED BY GASEOUS STREAMS

FIELD OF THE INVENTION

The present invention relates to a device for the separation of liquid and/or solid pollutants entrained by gaseous streams.

BACKGROUND OF THE INVENTION

In the current state of the art, various techniques are adopted for eliminating liquid and/or solid micro-entrainments from streams of gas, air or vapour, which however have a modest and unstable efficiency (99.5%>8÷10 microns), as in the case of centrifugal, cyclonic or inertial separators. Or, in order to obtain higher efficiency values (99.5%>1 micron), double-step separators are used, i.e. having a first step with cartridges and a second step of the inertial type.

The cartridges are normally of the glass fibre, coalescent type, with a very high filtration threshold, to allow the coalescence process (agglomerations of small liquid particles to form larger particles).

These characteristics are such that the cartridges become obstructed by the solid pollutant and, within a relatively short time, produce a pressure drop which makes it necessary for them to be substituted. The number of cartridges used is correlated to the flow-rate to be disposed of and is generally quite a high number.

Their substitution creates various problems and operations, among which the necessity of a spare separator and the depressurization of the separator to undergo maintenance, can be mentioned.

This is followed by drainage phases of the separator, the opening of the separator, the disassembly of the blocked cartridges and the cleaning of the cartridge-holders.

Subsequently, new cartridges must naturally be assembled, the separator closed and the system repressurized.

To all of this, the cost of the new cartridges, the disposal of the obstructed ones, the transporting and personnel for all the operations indicated above, must be added.

Wherever there is a stream of gas, air or vapour, this stream must be cleaned of all foreign pollutants, both liquid and solid.

To have a technically clean stream of gas, air or vapor (99% elimination of micro-particles>1 micron) and guaranteeing this efficiency at all flow-rate levels within the scope of the project, without any obstruction or erosion processes, without the need for spare parts, or particular maintenance, is the objective to be reached by the separator of the invention.

SUMMARY OF THE INVENTION

The invention provides a device (10) for the separation of liquid and/or solid pollutants entrained by gaseous streams, comprising a separating element (11), contained inside a protective casing (12) which comprises a gas inlet and outlet (13, 14), wherein said separating element (11) includes a coil (17) characterized in that the above coil (17) is situated between an outlet disk (18), having an outlet hole (20), and an unloading disk (19), wherein said unloading disk (19) has a series of discharge channels (21), connected to outwardly located loops of the above coil (17) and a series of discharge channels (21'), connected to inwardly located loops of the said coil (17), so that the geometrical parameters of said coil (17) and the distribution of said discharge channels (21, 21') allow liquid and/or solid micro-particles to be eliminated from a stream of gas wherein the lower part of said separating element (11) comprises a collecting hopper (22), which is situated immediately under said unloading disk (19) to divert the portion of stream leaving said series of discharge channels (21) of the outwardly located loops, towards the discharge channels (21') of the inwardly located loops within a well defined space in order to form, in the area around the center of said hopper (22), a corona of ascending streams which create a vortex, said hopper (22) consisting of a cylindrical part, joined to the external diameter of said unloading disk and a conical end converging at the center with a circular opening (25) communicating with the underlying zone of said separator with the function of collecting the separated product, and including below said hopper (22), a dividing element (23).

The objective of the device of the invention is consequently to eliminate liquid and/or solid micro-particles from a stream of gas, air or vapour.

In particular, the aim is to eliminate from a stream of gas, air or vapour, in the order of 99.5% of liquid and/or solid micro-particles having a diameter>1 micron.

A further objective of the device of the invention is to rigorously maintain a constant efficiency at all flow-rate levels within the maximum flow-rate of the project.

Yet another objective of the device of the invention is to produce a device for the separation of pollutants which does not require maintenance or spare parts.

A further objective of the device of the invention is to produce a device for the separation of pollutants which is not subject to obstruction or erosion.

Finally, the aim is to limit external interventions solely to the unloading of the separated product, which can be effected either manually or automatically, without the necessity for stopping the unit.

These and other objectives are achieved by means of a device for the separation of liquid and/or solid pollutants entrained by gaseous streams, according to claim 1, to which reference should be made for the sake of brevity.

Other characteristics of the present invention are also defined in the other claims.

BRIEF DESCRIPTION OF THE SEVERAL VIEWS OF THE DRAWINGS

Additional objectives and advantages of the present invention are evident from the following description and enclosed drawings, provided solely for illustrative and non-limiting purposes, wherein.

DETAILED DESCRIPTION OF THE INVENTION

Figure 1:
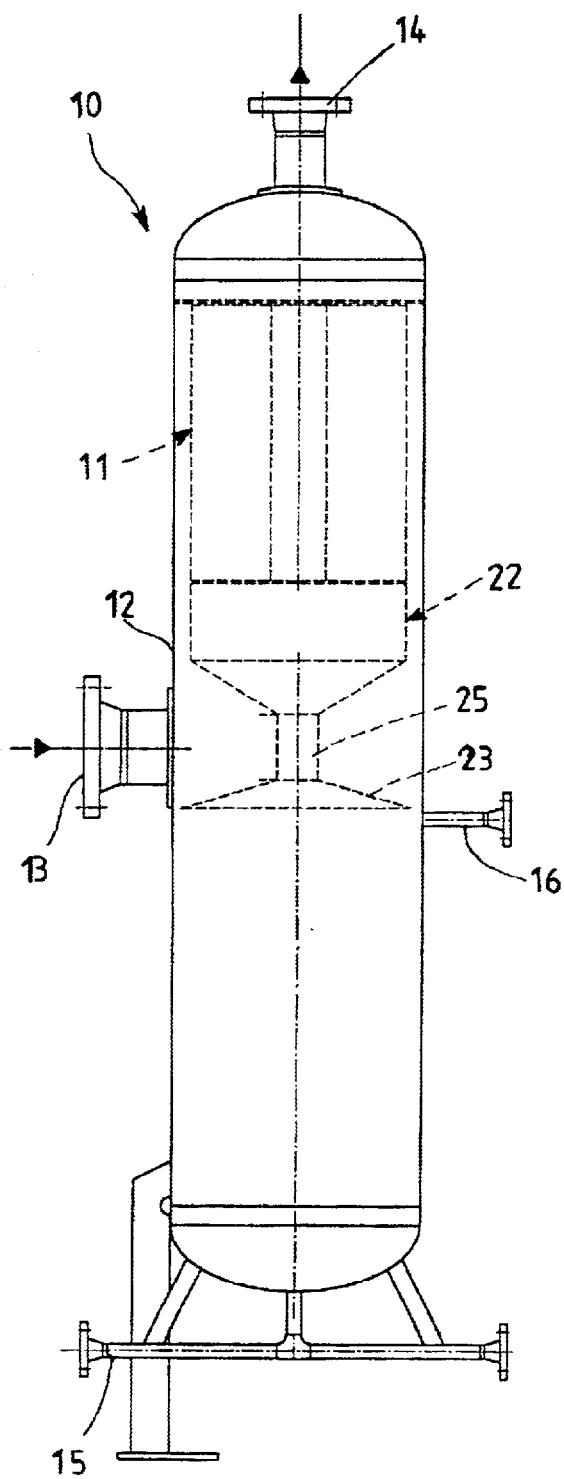
FIG. 1 shows a schematic representation of the device for the separation of liquid and/or solid pollutants entrained by gaseous streams, according to the present invention.
Figure 2:
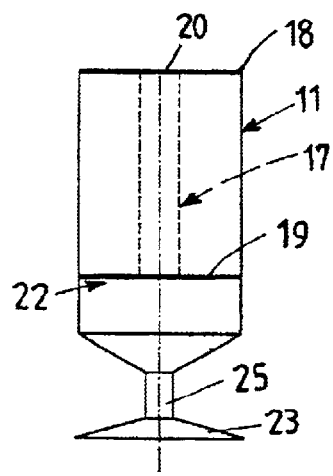
FIG. 2 shows a schematic representation of the separating element, relating to the device of the present invention.
Figure 3:
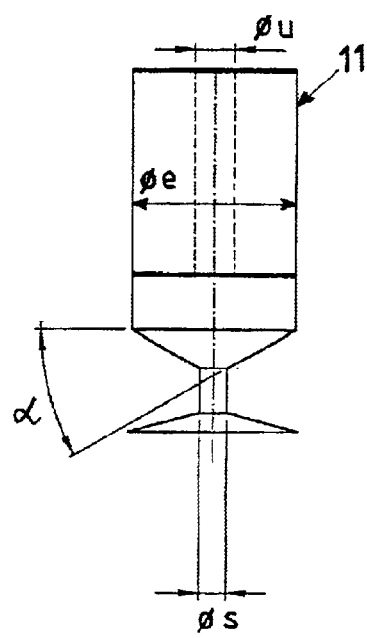
FIG. 3 shows a schematic representation of the separating element of FIG. 2, indicating the main dimensional relations.
Figure 4:
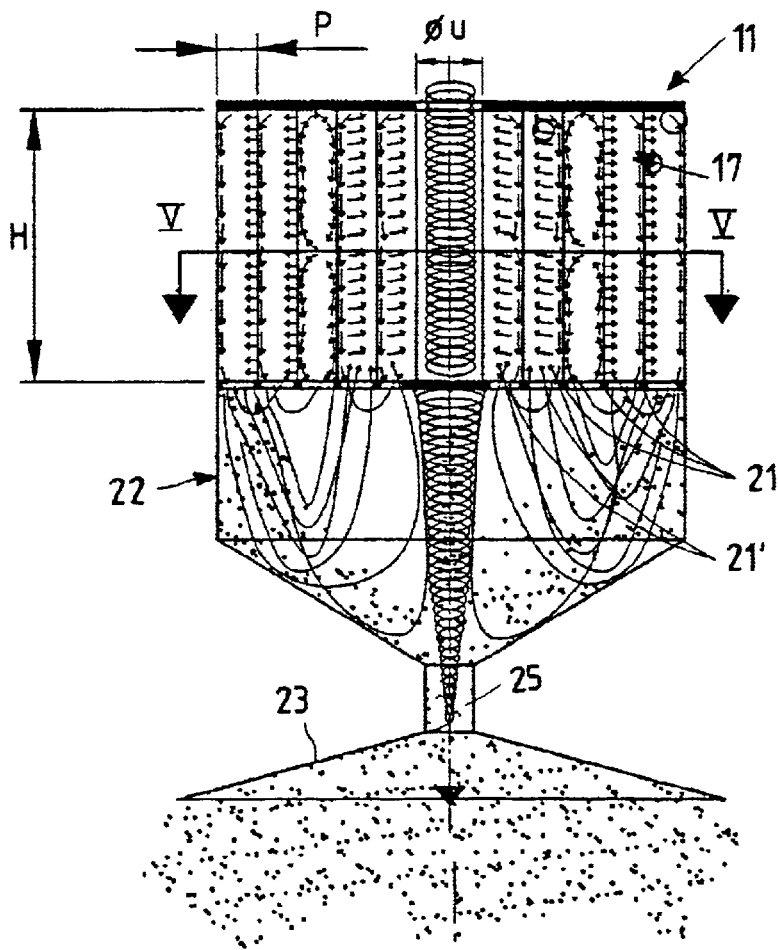
FIG. 4 shows a schematic representation of the separating element of FIG. 2, indicating the internal flow of the streams.
Figure 5:
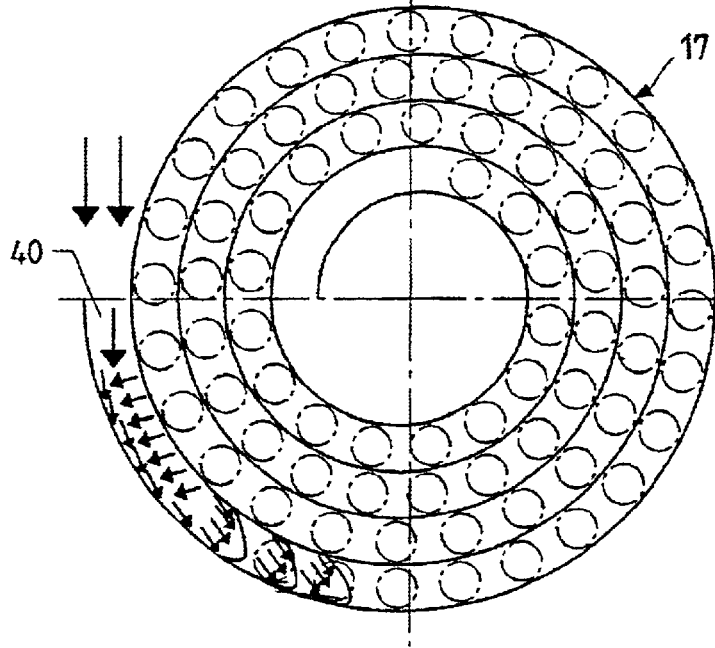
FIG. 5 shows a section, according to the V—V plane of FIG. 4, of the separating element.

With particular reference mainly to FIG. 1, the device for the separation of liquid and/or solid pollutants entrained by gaseous streams, according to the present invention, is indicated as a whole by reference number 10.

The device 10 comprises a separating element 11, contained inside a protective casing 12.

The casing 12 also comprises a gas inlet 13 and a gas outlet 14, as well as a drainage channel 15 and a level indicator 16.

The separating element includes a coil 17; the coil 17 is situated between two disks 18 and 19: an upper or outlet disk 18, with a single central outlet hole 20 and a lower or unloading disk 19, containing a series of discharge channels 21 inside the rectangular profile 40 of coil 17 for the whole of its length.

The geometrical parameters of the coil 17 and the distribution of the discharge channels 21 are of an experimental origin and are of fundamental importance for the functioning of the system and will be illustrated in more detail below.

In the lower part of the separating element 11 there is a collecting hopper 22, which is situated immediately under the unloading disk 19 and, as a result of precise geometrical parameters of an experimental origin, it performs the task of diverting a part of the stream leaving the unloading channels 21 of the external loops, towards the discharge channels 21' of the internal loops within a well defined space, thus creating, in the area around the centre of the hopper 22, a corona of ascending currents which form a vortex (cyclonic) having an anti-clockwise rotation.

This vortex (cyclonic) consists of an external ascending rotating stream which, when it approaches its "eye", inverts its movement and begins to descend.

It cannot be excluded, however, that the clockwise or anti-clockwise rotation of the vortex may depend on the boreal or austral hemisphere of the earth's surface, depending on the geographical position in which the device of the invention is used, the device remaining entirely unvaried, also with respect to the innovative concepts expressed herein.

The hopper 22 consists of a cylindrical part, joined to the external diameter of the unloading disk and a conical end converging at the center with a circular opening 25 communicating, by means of a short vertical duct, with the underlying zone of the separator with the function of collecting the separated product; below the hopper 22 there is also a dividing element 23.

The functioning principle of the device of the present invention is based on the use of a secondary branch 23 of the boundary layer stream which is generated in the as a result of the centrifugal force produced by the stream of gas compelled to follow a curvilinear path inside the coil itself.

This secondary branch 23, together with a portion of the main stream, is orthogonal with respect to the winding plane of the coil 17 and moves downwards on the external wall of the duct 40 where the discharge channels 21 are situated, through which it leaves the external loops and enters the internal loops joining the main stream which is now close to the outlet.

The function of the coil 17 is to create a rectangular duct down which the stream of gas flows, to compel all the fluid lines forming the stream to enter into contact with the external wall of the coil 17, as well as to create a centrifugal force, with an expansion which is such as to allow the formation of a boundary layer having a thickness sufficient to guarantee adherence to the wall.

The fluid lines of the stream of gas containing liquid and/or solid micro-particles are compelled, due to the curvature of the duct 40, to enter into contact countless times with the external wall of the duct 40, i.e. in a zone where the boundary layer stream is operating. This zone can be considered as being a rest zone, where the velocities are extremely reduced and where the polluting particles lose their energy and are conveyed towards the discharge of the secondary branch of the boundary layer stream, by the force of gravity. In this separation phase, the liquid particles initiate an agglomeration process adhering to each other and, at the same time, enveloping the solid micro-particles which are consequently definitively removed from the main stream inside liquid macro-particles.

In the absence of a liquid phase, the task of separating the solid micro-particles<5 microns and keeping them separate until they are expelled into the bottom of the tank, is delegated to the vortex (cyclonic) which is generated under the unloading disk 19 of the coil 17 activated by the geometrical conformation of the collecting hopper 22. Due to their agglomeration, the liquid particles (also containing solid dust) are expelled from the discharge holes of the external loops of the coil 17, after having acquired dimensions (and therefore mass) sufficiently large to enable them to fall as a result of gravity.

The dry solid particles, or liquid particles with dimensions<5 microns, could instead be sent towards the outlet by the stream flowing from the internal loops, if they were not "sucked up" by the vortex (cyclonic) and expelled downwards once reaching the eye of the vortex, where there is descending rotational stream.

In order to guarantee the correct functioning of the system, the adherence of the boundary layer stream to the wall of the duct 40 must be kept stable and consequently its thickness should be calculated with the following relation:

$$\delta s = C * \sqrt{\frac{vop}{Vs}} * \sqrt{SVs} > 0{,}28125$$

$\delta s$=thickness of the boundary layer, in mm.
C=experimental coefficient=0.625
vop=kinematics viscosity of the gas under the project conditions (P and T): $m^2/s \times 10^{-6}$
Vs=flow-rate in the duct: m/s
SVs=expansion of the spiral coil: m To meet the flow-rate, the coil 17 can have various principles or various elements with one principle in parallel.

The coil 17 forms the rectangular duct 40, of which the longer side H is vertical whereas the shorter side P is horizontal.

The coil pitch is constant.
The shorter side of the duct "P" also represents the pitch.
The P/H ratio should be<0.0607.
The number of loops should be>5.
The winding is in a clockwise direction.
The mouth section of the duct is:

$$P/H = \frac{Qe * 10^{-6}}{3600 * Vs} = mm^2$$

Qe=actual volumetric flow-rate in $m^3/h$
Vs=average rate of the stream of air or gas at the mouth of the duct m/s<15 (for vapour$\leq$30).

The coil is made of sheet metal having a 2b surface finish, consisting of pieces with TIG welding without any roughness.

The coil, as indicated above, is held between two disks, an upper outlet disk 18 and a lower unloading disk 19.

The upper disk 18 has a central hole 20 having a diameter Φu which is such as to induce a rate within the range of 15÷22.5 m/s depending on the density of the gas. For vapour, the rate is<35÷40 m/s.

The lower disk 19 has a series of discharge channels 21, 21' situated inside the duct 40 and distributed according to the following table of an experimental origin.

| % EXPANS. × TOT.EXPANS.DUCT Svc | % ASC × TOT.ASC mm² % |
|---|---|
| 26.5 = mm | 25.5 = mm² |
| 23.3 = mm | 22.4 = |
| 19.9 = mm | 20.4 = |
| 16.7 = mm | 17.4 = |
| 13.6 = mm | 14.3 = |

The coil should have a curvature ratio which satisfies the following relation:

$$\frac{\phi u}{\phi e \text{ coil}} * \frac{1}{nr \cdot \text{loops}} \leq 0.055$$

(adimensional value)

It should have a P/SVs ratio<0.005263 (adimensional value).

And a "contact" ratio Qe/As<0.065267 m³/s×m²

Φu=hole diameter of the coil outlet=mm.

Φe coil=external coil diameter=2 Rps=mm.

P=pitch=mm.

SVs=coil expansion=mm.

Qe=actual volumetric flow-rate m³/s.

As=coil wall area=SVs×H=m²

The distribution of the discharge holes has been experimentally optimized to obtain the greatest pressure difference between duct 40 and unloading hopper 22.

This pressure difference is between 30÷50 mm H₂O and allows the secondary branch of the stream to totally flow downwards against the external wall of the first loops of the duct 40, carrying the pollutant contained therein towards the discharge outlet.

The discharge section produced with holes ΦF=P−2, is given by the following relation:

$$ASC = \frac{AC}{(\phi F + 2)^2} \phi F^2 * 0.785 = mm^2$$

ASC discharge section in mm²

AC duct area SVc×P in mm²

ΦF=discharge hole diameter=P−2 in mm.

The description provided clearly illustrates the characteristics of the device for the separation of liquid and/or solid pollutants entrained by gaseous streams, as well as the advantages and functioning.

In order to define the above advantages more accurately, we would like to make the following conclusive comments and observations.

The device can guarantee separation efficiency, regardless of the quantity and quality of the pollutant.

It also has great versatility and can be used in the widest range of technical fields, of which some possible examples are listed hereunder.

The device can be used in the protection of compression and reduction stations in pipe-lines for the transportation of natural gas, particularly in unprotected areas.

Current technology, in fact, uses two-step separators with coalescent cartridges and laminar block. These require spare parts and maintenance, operational stoppages, drainage and the accumulation of cartridges to be disposed of. The costs of these separators are from 3 to 6 times higher than the cost of a separator according to the invention, to which the saving of spare parts, maintenance and plant stoppages should be added.

The device can also be used at the well-head on off-shore and on-shore gas platforms. The cost of the separators of the invention is less than that of those traditionally used and with an efficiency 50 times higher.

The device can also be used for the protection of compressors of any process gas or land receiving stations of gas sea-lines, or to protect turbogas for the production of electric energy.

Other possible uses of the device according to the present invention are: vapour transfer for turbines; compressed air treatment for all uses; the protection of gaschromatographs or other instruments through which a gas passes; on the compressor discharge to eliminate lubricating oil entrained together with gas; in gas production plants with molecular membranes to protect the latter; in urban gas distribution to protect reduction and measurement stations; on off-shore oil platforms for the treatment of gas emerging together with the oil.

The device of the invention can also be used in the ecological field for the treatment of fumes or vapors discharged into the atmosphere in the presence of extremely low pressures, high temperatures and high flow-rates. One of the main uses of the device is in ethylene plants (decoking); other uses relate to the wood, cement industries and energy in general.

The separator of the invention has no limits for usage as far as flow-rates, pressures or temperatures are concerned. The functioning principle can be adapted to any project condition.

It is also evident that, in the embodiment of the invention, the materials, forms and dimensions of the details illustrated can vary according to the demands and can be substituted with other technically equivalent alternatives.

The scope of the invention is defined in the claims enclosed with the present patent application.

What is claimed is:

1. A device (10) for the separation of liquid and/or solid pollutants entrained by gaseous streams, comprising a separating element (11), contained inside a protective casing (12) which comprises a gas inlet and outlet (13, 14), wherein said separating element (11) includes a coil (17) characterized in that said coil (17) is situated between an outlet disk (18), having an outlet hole (20), and an unloading disk (19), wherein said unloading disk (19) has a series of discharge channels (21), connected to outwardly located loops of said coil (17) and a series of discharge channels (21'), connected to inwardly located loops of said coil (17), so that the geometrical parameters of said coil (17) and the distribution of said discharge channels (21, 21') allow liquid and/or solid micro-particles to be eliminated from a stream of gas wherein the lower part of said separating element (11) comprises a collecting hopper (22), which is situated immediately under said unloading disk (19) to divert the portion of stream leaving said series of discharge channels (21) of the outwardly located loops, towards the discharge channels (21') of the inwardly located loops within a well defined space in order to form, in the area around the center of said hopper (22), a corona of ascending streams which create a vortex, said hopper (22) consisting of a cylindrical part, joined to the external diameter of said unloading disk and a conical end converging at the center with a circular opening (25) communicating with the underlying zone of said separator with the function of collecting the separated product, and including below said hopper (22), a dividing element (23).

2. The device (10), according to claim 1, characterized in that a coil allows the use of a secondary branch (23) of the boundary layer stream which is generated as a result of the centrifugal force produced by the stream of gas compelled to follow a curvilinear path inside the coil itself.

3. The device (10), according to claim 1, characterized in that the thickness of the wall of above said coil (17) is calculated according to the following relation:

$$\delta s = C * \sqrt{\frac{v\rho}{Vs}} * \sqrt{SVs} > 0.28125$$

wherein δs is the thickness of the boundary layer, C an experimental coefficient, vρ the kinematics viscosity of the gas under the project conditions (P and T), Vs the flow-rate in the duct (40) and SVs the expansion of the spiral coil.

4. The device (10), according to claim 1, characterized in that said coil (17), has a rectangular profile (40), having longer side H measured between the outlet disk and the unloading disk and a shorter side P measured between coil loops.

5. The device (10), according to claim 3, characterized in that, for said coil (17), the P/H ratio should be <0.0607 and the number of loops should be higher than five.

6. The device (10), according to claim 5, characterized in that the mouth section of the coil (17) is:

$$P/H = \frac{Qe * 10^{-6}}{3600 * Vs}$$

wherein Qe is the actual volumetric flow-rate and Vs is the average rate of the stream of air or gas at the mouth of the coil (17).

7. The device (10), according to claim 1, characterized in that said outlet disk (18) has a central hole (20) having a diameter Φu which is such as to induce a rate within the range of 15+22.5 m/s depending on the density of the gas, whereas for vapour, the rate is <35–40 m/s.

8. The device (10), according to claim 1, characterized in that said unloading disk (19) has a series of discharge channels (21, 21') situated inside the coil (17) and distributed with decreasing interaxes.

9. The device (10), according to claim 1, characterized in that said coil (17) has a curvature ratio which satisfies the following relation $$\frac{\phi u}{\phi e \text{ coil}} * \frac{1}{nr \cdot \text{loops}} \leq 0.055$$

and has a P/SVs ratio <0.0005263, and a "contact" ratio Qe/As <0.065267 m³/s×m², wherein Φu is the hole diameter of the outlet hole (20) of the coil (17), Φe coil is the external diameter of the coil (17), p is the pitch, SVs is the expansion of the coil (17), Qe is the actual volumetric flow-rate and As is the wall area of the coil (17).

10. The device (10), according to claim 1, characterized in that the distribution of the discharge channels has a discharge section produced with holes ΦF=P–2, given by the following relation:

$$ASC = \frac{AC}{(\phi F + 2)^2} \phi F^2 * 0.785 = \text{mm}^2$$

wherein ASC is the discharge section, AC is the duct area and ΦF is the discharge holes diameter.

* * * * *